UNITED STATES PATENT OFFICE.

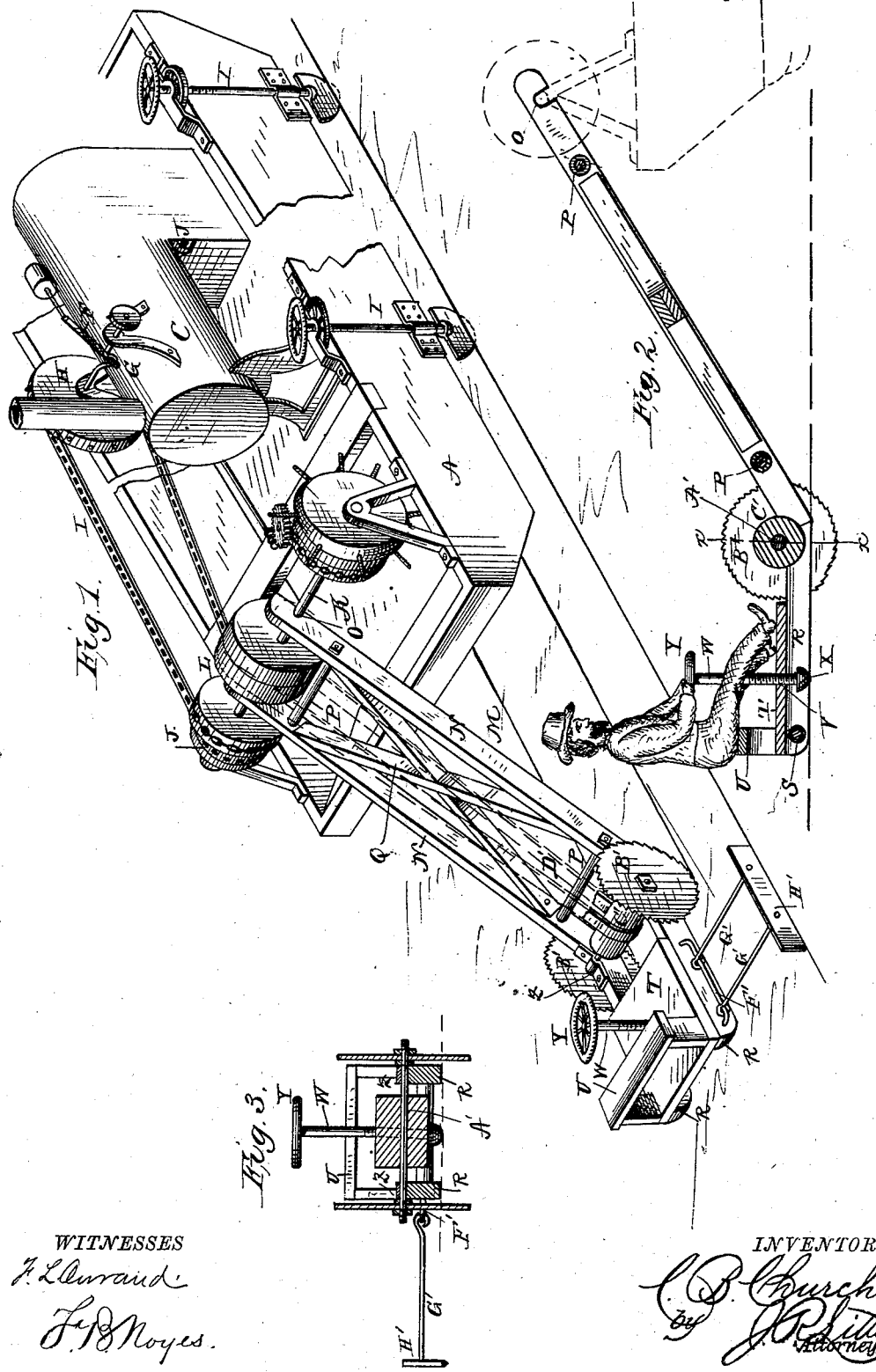

CHARLES B. CHURCH, OF WASHINGTON, DISTRICT OF COLUMBIA.

ICE CUTTER AND HARVESTER.

SPECIFICATION forming part of Letters Patent No. 281,751, dated July 24, 1883.

Application filed November 6, 1882. (No model.)

*To all whom it may concern:*

Be it known that I, C. B. CHURCH, a citizen of the United States, residing at Washington, in the District of Columbia, have invented certain new and useful Improvements in Ice-Cutting Machines for Harvesting Ice; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to ice-cutting machines that are used in harvesting ice; and it consists, substantially, in an improved cutting device which is adapted to be applied to and be driven by an ice-harvester, its novelty being in the construction, arrangement, and operation of parts, as will be hereinafter more fully described, and particularly pointed out in the claims.

The invention has for its object to provide a simple and efficient device that can be conveniently and quickly adjusted to regulate the depth of the cut, and that will cut the ice into blocks of uniform width and size in either direction without turning the machine.

In the drawings, Figure 1 is a perspective view, showing my ice-cutter applied to the harvester. Fig. 2 is a vertical longitudinal sectional view of the cutter. Fig. 3 is a transverse vertical sectional view on the line $x\ x$, Fig. 2.

Corresponding parts in the figures are denoted by the same letters of reference.

Referring to the drawings, A designates the harvester, which may be of any suitable construction, but is preferably constructed as shown in the accompanying drawings, which construction has been made the subject of a separate application for Letters Patent. Said harvester A comprises a body, B, carrying the engine C or other driving mechanism connected with a rotary axle that is provided with fixed drive-wheels. The drive-rod F of the engine engages a crank-shaft, G, having a fixed chain-pulley, H, which latter is connected by a chain belt, I, with another chain-pulley, J, fixed on a transverse shaft, K, journaled at the front of the harvester. Transverse rotary shaft K is also provided with a centrally-arranged fixed pulley, L, adjoining which may be arranged a loose pulley or other suitable mechanism by which the belt may be thrown off pulley L and out of operation.

M designates the removable ice-cutting device, the two parallel main beams of which, N N, are provided with bearings O at their upper ends, which are placed over and on shaft K, with the pulley L between the beams. These beams N N are connected and braced by suitable cross-pieces or bolts, P P, at the top and bottom, and by an intermediate X-brace, Q. When the cutting device is in position on the harvester, the beams N N hang downwardly and forwardly, and are provided at their bottom ends with two front horizontal parallel extensions or beams, R R, which are connected at their front ends by a cross-piece or bolt, S.

On top front beams, R R, is formed a platform, T, having a seat, U, at its front end, for the operator, and said platform is formed with a centrally-disposed screw-threaded opening, V, in rear of said seat. In this opening V works a vertical screw-threaded rod or standard, W, having a rounded bottom, X, which works against the ice, and an operating hand-wheel, Y, at its top.

At the vertex of the angle formed by beams N and R are provided bearings Z Z for the transverse rotary cutter-shaft A', having at each end a fixed circular saw or cutter, B'. On said shaft A', between the beams, is fixed a pulley, C', connected by a belt, D', with the pulley L on rotary shaft K, and by this means the cutter-shaft is driven.

The usual pulleys and belts may of course be used in lieu of the chain belts and chain-pulleys, if desired.

When the harvester and cutting mechanism is in operation, the operator sits on seat U facing the saws, from which position he can conveniently operate the screw-threaded standard W. By lowering the standard the cutting device is elevated farther off the ice, which causes the saws to be also lifted or elevated in the kerf, so that the depth of their cut will be lessened. By turning the standard in the opposite direction, so that it will work up, the front of the cutting device will be lowered toward the ice, so that the saws will cut deeper.

It will be seen that by this simple means the depth of the cut can be quickly and conveniently regulated, as desired, by simply operating standard W, on which the front part of the cutter ordinarily is supported.

F' designates a rod arranged longitudinally on the left front beam R, to which is hinged, preferably, by lateral arms G' G', a guide plate or blade, H', parallel with beam R. This blade H' runs in the kerf last cut by the saws, and serves to hold the cutting device parallel with and at a uniform distance from this last-cut kerf, so that the blocks of ice will be of uniform width.

The harvester A is provided with two or more vertically-adjustable runners, I' I', at its left side, which also run in the last-cut kerf, and retain the harvester so that its line of movement will be parallel with said kerf, by which arrangement the harvester will operate the cutting mechanism while going either forwardly or rearwardly, and without turning around.

The operation and advantages of my invention will be readily understood by reference to the foregoing description, taken in connection with the annexed drawings.

The invention is very simple and efficient, and may be quickly and conveniently controlled and regulated.

I claim as my invention—

1. The combination, with a transverse rotary shaft, of an ice-cutting device provided with bearings at its top, adapted to be placed on and over said shaft, by which the rear portion of the cutting device is supported, and having a vertically-adjustable rod or standard at its front, by which the latter portion of the cutting device may be controlled to regulate the depth of cut, substantially as set forth.

2. The combination, with an ice-cutting device for use in connection with an ice-harvester, adapted to be hinged at its rear portion, and having the cutter or cutters about centrally or intermediately arranged, of a vertically-adjustable rod or standard at its front end, the lower end of which works against the ice to regulate the depth of cut, substantially as set forth.

3. An ice-cutting device for use in connection with an ice-harvester, having a platform at its front end, provided with a screw-threaded opening, through which works a screw-threaded vertically-adjustable standard or rod working against the ice to regulate the depth of cut, substantially as set forth.

4. The combination of the rear inclined parallel beams having bearings at their tops, the horizontal front parallel beams or extensions, provided with a cross-platform having a screw-threaded opening, a vertically-adjustable screw-threaded standard or rod working in said screw-threaded opening and against the ice, and saws or cutters (one or more) arranged at the vertex of the angle formed by the inclined and horizontal beams, substantially as and for the purpose set forth.

5. The combination, in an ice-cutting machine adapted to be hinged on an ice-harvester, and provided with cutting saws or disks, of the platform arranged in front of the cutters and provided with a seat at its front end, so that the operator sits facing the cutters, and also having a centrally-arranged screw-threaded opening in rear of said seat, and the vertically-moving screw-threaded rod or standard working in said screw-threaded opening, and provided with a rounded end for working against the ice, substantially as set forth.

6. The combination, with a rotary transverse shaft end provided with a fixed pulley, of the herein-described ice-cutting device, comprising the parallel inclined beams, having bearings at their tops to engage said shaft, with the pulley thereon between the beams, the parallel horizontal front extensions or beams carrying a cross-platform having the screw-threaded perforation, the vertically-adjustable rod or standard working against the ice, the transverse cutter-shaft journaled in bearings arranged at the vertex of the angle formed by the inclined and horizontal beams, the cutters or circular saws (one or more) fixed on said shaft, the pulley fixed on the cutter-shaft between the beams, and the driving-belt, substantially as and for the purpose set forth.

7. The combination of the parallel inclined beams, the horizontal front beams or extensions, said beams being separated and connected by suitable cross-pieces or bolts, and the transverse rotary cutter-shaft journaled in bearings at the vertex of the angle formed by the inclined and horizontal beams, and provided with cutters or circular saws, (one or more,) substantially as set forth.

8. The combination, with the ice-cutting device comprising the inclined beams, having bearings at their tops, and the horizontal front extensions or beams, of a guide blade or plate hinged to the left one of the horizontal beams and parallel therewith, said plate being adapted to run in the last-cut kerf, substantially as and for the purpose shown and specified.

In testimony whereof I affix my signature in presence of two witnesses.

CHARLES B. CHURCH.

Witnesses:
JOHN T. C. CLARK,
J. R. LITTELL.